United States Patent
Patin et al.

(10) Patent No.: US 7,100,727 B2
(45) Date of Patent: Sep. 5, 2006

(54) ARTICULATED VEHICLE

(75) Inventors: Pierre Patin, Paris (FR);
Pierre-Armand Patin, Meudon (FR)

(73) Assignee: 2P, Le Kremlin Bicetre (FR)

( * ) Notice: Subject to any disclaimer, the term of this patent is extended or adjusted under 35 U.S.C. 154(b) by 265 days.

(21) Appl. No.: 10/479,986

(22) PCT Filed: Jun. 6, 2002

(86) PCT No.: PCT/FR02/01940

§ 371 (c)(1),
(2), (4) Date: Dec. 8, 2003

(87) PCT Pub. No.: WO02/098722

PCT Pub. Date: Dec. 12, 2002

(65) Prior Publication Data

US 2004/0173981 A1    Sep. 9, 2004

(30) Foreign Application Priority Data

Jun. 6, 2001    (FR) .................................. 01 07405

(51) Int. Cl.
B62M 1/00    (2006.01)
(52) U.S. Cl. ................ 180/180; 180/205; 280/87.041; 280/201; 280/212
(58) Field of Classification Search ................ 180/180, 180/181, 205, 305; 280/201, 212, 216, 62, 280/87.01, 87.021, 87.041
See application file for complete search history.

(56) References Cited

U.S. PATENT DOCUMENTS 1,617,357 A * 2/1927 Walter ...................... 280/221
1,690,342 A * 11/1928 Madsen ...................... 280/257
3,572,456 A * 3/1971 Healy .......................... 180/217
4,423,795 A    1/1984 Winchell
5,040,812 A * 8/1991 Patin ............................ 280/62
6,315,313 B1 * 11/2001 Huang ......................... 280/216
6,334,838 B1 * 1/2002 Lee .............................. 482/51
6,367,824 B1 * 4/2002 Hayashi ........................ 280/62
6,543,560 B1 * 4/2003 Trefz et al. ................ 180/53.4

FOREIGN PATENT DOCUMENTS

| DE | 36 11 417 | 10/1987 |
|----|-----------|---------|
| FR | 2 639 016 | 5/1990 |
| FR | 2 688 465 | 9/1993 |
| GB | 1 561 253 | 2/1980 |

\* cited by examiner

Primary Examiner—Christopher P. Ellis
Assistant Examiner—Brian Swenson
(74) Attorney, Agent, or Firm—Young & Thompson

(57) ABSTRACT

The invention concerns an articulated vehicle comprising a rear frame (1) and a front frame (2) linked by an articulation (3) associated with the device (30, 6) for removably locking controlled by a pendular member (4, 62) mounted oscillating on the front frame (2) between a median position for unlocking the articulation and a spaced apart position for locking the articulation, at least when the vehicle is stopped. The vehicle comprises means (5) for controlling the unlocking of the articulation, at least during start-up, including an auxiliary platform (5) integral in rotation with the rear frame (1) and comprising, at least, two footrests (51) arranged at substantially the same level relative to the ground, on either side of the axis (x'x) of the articulation (3) and constituting each, on the side towards which the front frame (2) is inclined, a support for said front frame (2) to be set upright by the vehicle driver, the pendular member (4, 62) returning to its median position for unlocking the articulation.

18 Claims, 4 Drawing Sheets

ARTICULATED VEHICLE

BACKGROUND OF THE INVENTION

The object of this invention is an articulated vehicle, and specially, a three-wheeled one fitted with a stabilization device.

DESCRIPTION OF THE RELATED ART

It is well known that two standards of terrestrial vehicles exist: the first type is represented by vehicles with stationary stability, such as three-wheeled or four-wheeled vehicles; the other type is represented by two-wheel vehicles, which become stabilized only when driven above a minimal speed, and which the driver is able to lean in curves, so as to keep the center of gravity in the plane of the apparent vertical, due to combined gravitational and centrifugal forces.

The usual four-wheel vehicles are wider and less workable in city traffic than the two-wheeled ones; as a set off, two-wheeled vehicles can barely be provided with a protection body against collisions or weather inclemency. Indeed, the driver should always be able to set foot on the ground, to the side where the vehicle leans at standstill, and again so as to raise the vehicle back vertically at starting.

For several years, a solution to those problems has been sought, such as an intermediate vehicle fitted with two rear wheels in order to provide stability at standstill, but articulated so as to behave while traveling like a two-wheeled dynamically stabilized vehicle, leaning into curves so as to compensate for the centrifugal force.

Typically, such a vehicle rests on three wheels, and is constituted of two chassis, pivoted upon each other through a longitudinal axis: respectively a backward chassis, resting on two spaced wheels, and a frontward chassis, resting upon the steering front wheel, and supporting a protection body fitted with at least one seat for the driver.

While traveling, the link is disengaged so the driver is enabled to incline the front chassis with the body, in order to keep the longitudinal mid plane of said body in the alignment of the apparent vertical, thus allowing the vehicle to behave similarly to a motorcycle. On the contrary, when the speed is reduced below a certain value, the link is locked and the vehicle becomes stable due to the rear axle.

Such vehicles are the object of former patents by same applicant, upon which French patents FR-A-2600612, FR-A-2639016 and FR-A-2688465.

Generally speaking, the link is constituted of two parts assembled upon each other and locked in rotation, respectively, from both chassis, and wherein the locking of the link is provided by a pendulum type device, subjected to combined gravitational and centrifugal forces, making both parts of said link integral when deviated to either side of midplane of inclined liable. Particularly, at standstill, the chassis carrying the pendulum device inclines soon as the speed is reduced below a certain value, and this inclination of midplane creates a swerving of said pendulum, thus operating the locking of the link and consequently ensuring the stabilization of the vehicle.

However, this locking system is removable, since the link should be unlocked so as to allow the vehicle to rise back vertically, while pendulum returns into mid-plane of chassis.

Particularly, at standstill, the vehicle is slightly inclined, and should be raised while starting so as to unlock link.

Similarly, a bicycle or motorcycle rider raises its vehicle when starting it, so as to find himself immediately in a balanced position and travel straight forwards, and therefore he has one foot set on the ground meanwhile he leans on the steering handlebars.

This simple act becomes impossible to perpetuate out of an articulated vehicle fitted with a close body, preventing the driver to set the feet on the ground at starting, unless there is an appropriately built-in aperture. Now if the vehicle does not stand vertically at starting, it will turn sideways towards the side upon which it is leaning, before the speed becomes sufficient to provide dynamical stabilization.

SUMMARY OF THE INVENTION

The aim of the present invention is to solve this problem by operating the unlocking of the link at starting of the vehicle, even when driving inside a totally enclosed body.

The invention generally relates to an articulated vehicle traveling longitudinally on the ground, constituted by two chassis connected to each other by an articulation pivoting around a longitudinal axis running parallel to the traveling direction, each of said chassis having its mid-plane running through the articulation axis, respectively a first chassis resting on the ground through a first rolling device centered on a first mid-plane perpendicular to the ground, and a second chassis resting on the ground through a second rolling device, said second device being allowed to be steered relative to the traveling direction, and centered on a second medium plane, liable to be inclined by the ground by rotation around the articulation axis.

This articulation may be locked by a device constituted of two parts which are integral in rotation, respectively from the first and the second chassis, and by a removable locking system constituted of a pendulum type device operating the locking of the rotation of said two parts, assembled oscillating on the second chassis, on both sides of the second mid-plane between a medium unlocking position, in relation to which the second mid-plane is directed according to the direction of the pendulum, as well as a spaced unlocking position, a least at standstill of vehicle, through inclination of second chassis in relation to the direction of pendulum.

According to the invention, the vehicle comprises a system controlling the unlocking of the articulation, at least at starting of vehicle, constituted of an auxiliary platform, locked in rotation with the first chassis, the said platform including at least two footboards located substantially at the same level above the ground, on both sides of the articulation axis, each of said footboard providing a step on either side towards which the second chassis is leaning, allowing the driver to rise up the vehicle, with the return of pendulum into median unlocking position.

In the first embodiment, the locking device comprises a set of articulated bars assembled in a deformable parallelogram system, comprising two spaced bars substantially parallel to the ground, respectively a first bar locked in rotation to the first chassis, and a second bar hinged around a longitudinal axis located on second chassis, in its midplane, and two vertical bars located parallel on each side of said mid-plane. In this embodiment, the controlling pendulum device comprises a stiff beam hinged onto the first chassis, transverse located between the two vertical bars, and linked with means to ensure integral in rotation of at least one of the vertical bars with said beam, by traveling it sideways of second mid-plane.

Advantageously, the first bar of the articulated system is constituted with two brackets rigidly tighten to the first articulation, located on each side of longitudinal axis of said articulation, while the second bar is constituted with an equalizer, linked to the central part of second chassis, around a longitudinal axis located in the mid-plane of said second chassis, as a column rigidly tighten to the second part of the articulation, bearing at least one seat for the driver.

Preferably, the deformable parallelogram is of the same type as described in Applicant's former French patent 2688465, where the locking system is constituted with two carriages upon which the pendulum cross beam is assembled, so as to slide parallel to itself, while the carriages freely travel along the vertical bars of the parallelogram as long as the center of gravity of said cross beam remains centered within the mid-plane of the second chassis, and where the cross beam causes the locking of at least one of the two carriages on its corresponding vertical bar, operating the locking in rotation of said vertical bar with cross beam, as soon as said cross beam is deviated on either side of the second mid-plane.

Advantageously, the auxiliary platform may be simply constituted with two footboards, respectively assembled on each vertical bar of deformable parallelogram.

In a different type of embodiment, the locking device of the articulation is constituted with a first collar-type part integral in rotation with the first chassis, mounted around the articulation axle of both chassis, and with a second bracket-type part integral in rotation with the second chassis, mounted transverse to the articulation axle inside the collar, and with a pendulum type control device constituted with an oscillating crutch hinged on one end of said bracket, around an axis running parallel to the articulation axle, located in the mid-plane of the second chassis. The crutch oscillates inside the collar and rests on its lower end against said collar, in case the mid-plane inclines beyond the apparent vertical, thus locking the inclination by buttressing the crutch against the collar.

In both embodiments, the pendulum device controls the locking of the articulation by moving away from the mid-plane of second chassis, and this may happen while traveling, in case the driver does not incline the body of the vehicle correctly, by holding the mid-plane of second chassis coincident with the direction of the pendulum, that is the result of combined gravitational and centrifugal forces.

As described in former patents of same Applicant, this system prevents driving errors such as a lack of inclination given to the vehicle by an inexperienced driver from inside the body. This applies also to slow speed traveling in busy road traffic situations.

By contrast, while the vehicle travels at a speed that is sufficient to ensure dynamical stabilization naturally, it may be preferable to avoid any risk of abnormal locking, due for instance to a wrong gesture of driver, or to a major unevenness of the road.

In a preferred embodiment, the vehicle comprises a removable bolting system of the pendulum device in its median unlocked position for road traveling, with a control of the bolting device above a certain speed value.

Thus, above a certain speed value which may be chosen either by the manufacturer or possibly by the driver, the locking system is not effective any further, the body of the vehicle is uninhibited, and its driving becomes absolutely similar to usual two-wheeled vehicle driving.

Such a bolting system may be constituted with a bolt that is displaceable between a spaced position allowing the release of the pendulum device so as to lock the said pendulum in its median position, with a speed detector, and with a control device for the displacement of the bolt from released to engaged position, operated by the speed detector when the speed exceeds a certain value.

Advantageously, the control device for the displacement of the bolt from released to engaged position may be operated electrically with the means of impulses transmitted by the speed detector pitched in t1 time intervals inversely proportional to the speed of the vehicle, through a temporized relay fitted with an impulse reception circuit, a supply circuit for the control device during a t2 time from the impulse, a primary closing circuit for the supply circuit with a given T delay time after each impulse, and a secondary closing circuit for the supply circuit during a given To time after the impulse, thus closing the supply circuit continuously when $T_1$ time between two impulses is shorter than T delay time of primary closing circuit, and continuously opening in the opposite circumstance.

BRIEF DESCRIPTION OF THE DRAWINGS

However, the invention will be substantially understood with the following descriptions of specific embodiments, as non-restrictive examples illustrated on appended drawings.

DESCRIPTION OF THE PREFERRED EMBODIMENTS

Figure 1:
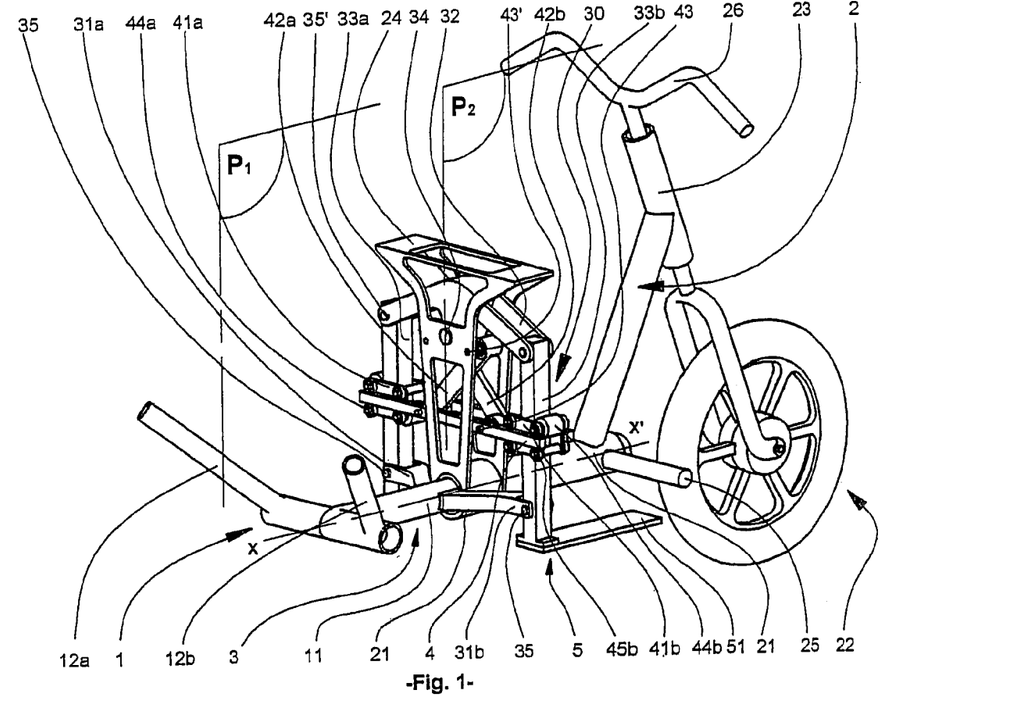
FIG. 1 depicts a partial perspective view of a first embodiment of the vehicle, articulated according to the invention.

FIG. 1 depicts a partial perspective view of the vehicle, articulated according to the invention, comprising two chassis, respectively a rear chassis 1 and a front chassis 2, hinged on top of each other around a longitudinal axis x'x, by means of articulation 3 constituted of a central tube 11 and a tubular sheath 21, assembled in rotation by the means of non-depicted bearings.

Central tube 11 is integral with rear chassis 1, and bears on its rear end two brackets 12a and 12b, both resting on non-depicted rear axle which rests on the ground by the means of two spaced wheels, which rotates around a transverse axis located orthogonal to longitudinal axis x'x of central tube 11. Tubular sheath 21 is integral with front chassis 2, which rests on a front steering wheel 22, mounted on steering column 23 and directed by the means of handlebars or steering wheel 26. Furthermore, front chassis 2 bears at least one seat for the driver. The whole unit is enclosed in a non-depicted protection body.

Rear chassis 1 is centered on a longitudinal mid plane P1 crossing articulation axis x'x and orthogonal to the ground, while front chassis 2 is centered on a longitudinal mid plane P2 which may incline on either side in relation to first mid plane P1, by rotating around articulation axis x'x. However, the inclination of front chassis 2 in relation to rear chassis 1 may be prevented by locking device 30 of articulation 3, operated by pendulum device 4.

In the embodiment shown on FIG. 1, the locking device is of the type of a deformable parallelogram, the design of which has been described in details in former French patent 2688465 of same Applicant.

Generally speaking, such a system comprises a set of articulated bars constituting a deformable parallelogram assembly, fitted with two spaced bars located substantially parallel to the ground, respectively a lower bar 31 and an upper bar 32, both articulated around respectively lower axles 35 and upper axles 35', on two vertical bars 33a and 33b located on either sides and parallel to mid plane P2 of the front chassis 2.

In the embodiment according to the present invention, as depicted on FIG. 1, the lower bar is constituted with two brackets 31a and 31b, assembled on central axle 11 of rear chassis 1, and located on either side of said chassis 1, while upper bar 32 is hinged around an axle 34, the said axle 34 running parallel to articulation axis x'x, on a central column 24 tighten by its lower end to tubular sheath 21, and consequently integral in rotation with front chassis 2. For instance, the central column 24 may advantageously bear at least one seat for the driver.

It is now obvious that an inclination of mid plane P2 of front chassis 2 in relation to the ground causes a deformation of parallelogram 30, with an inclination of both vertical bars 33a and 33b, which are parallel to mid plane P2, while upper bar 32 remains parallel to lower bar 31, the said lower bar being kept parallel to the ground by the two wheels 13.

Generally speaking, the articulation locking system comprises two parts, respectively integral to each of the two articulated chassis, that is to say a first part constituted with two bars 31 and 32, integral in rotation with rear chassis 1, and a second part, constituted with the two vertical bars 33a and 33b, integral in rotation with front chassis 2. The articulation may be locked by the means of integrating the two parts, in order to prevent the deformation of parallelogram 30.

For this purpose, a pendulum type device will be used, constituted with a transverse beam 4 assembled to two self locking carriages 41a, 41b, which detailed description is the object of formerly quoted French patent 2688465 of same Applicant.

When the vehicle stands in a position where both mid planes are coincident, the transverse beam 4 provides a parallel beam to bars 31 and 32, the said bars being parallel to the ground, and consequently substantially horizontal.

As mentioned in French patent 2688465, transverse beam 4 is hung with front chassis 2 by the means of two rods 42a and 42b, the said rods being hinged respectively by their lower end 43 with said transversal beam 4, and by their upper end 43' with central column 24 of front chassis 2.

However, in the embodiment of French patent 2688465, the two suspension rods of pendulum beam converge to a point located substantially higher above the upper longitudinal articulation axis, constituting an instantaneous rotation center of pendulum, while in the present embodiment, the two suspension rods 42a and 42b are mounted crosswise, with their lower articulation axis 43 and upper articulation axis 43' respectively located on either side of mid plane P2 of second chassis 2. It actually appears that such a device fitted with crosswise mounted rods operates in a rather sensitive and fast way, especially when rods 42 are inclined at a 45° angle from the vertical while vehicle stands in balanced position.

As substantially described in French patent 2688465, hung beam 4 behaves as a pendulum, detecting any variations of inclination of the body of vehicle, carried by front chassis 2, in relation to the direction of the apparent vertical. In case of deviation towards either side, this pendulum type beam locks the bars of parallelogram 30 integral, thus preventing its deformation, and consequently locking articulation 3.

For this purpose, beam 4 is assembled to side bars 33 by the means of two carriages 41a and 41b, mounted sliding on beam 4, by the means of two pairs of bearings, respectively external bearings 44 and internal bearings 45, while each side bar 33a and 33b of deformable parallelogram 30 is guided with a slight clearance between the corresponding bearings of carriages 41a and 41b.

Consequently, both carriages 41a and 41b may move freely along side bars 33a and 33b, as long as said side bars remain perpendicular to pendulum beam 4.

By contrast, if a side bar 33 inclines in relation to beam 4, it bears against two opposite bearings, respectively external bearings 44 and internal bearings 45, being driven by friction if the inclination continues.

However, external upper bearings 44a and 44b, as well as internal lower bearings 45a and 45b are fitted with free rollers mounted so as to roll only in the corresponding direction aiming to decrease the angle included between upper end of side bar 33 and central part of transversal beam 4, so as to lift mid plane P2, and tending to bring gravitational center of beam 4 back into said mid plane.

Consequently, when traveling on the road, the driver may incline the vehicle into the curves, while maintaining mid plane P2 of front chassis 2 within the plane of the apparent vertical, due to combined gravitational and centrifugal forces. The gravitational center of transversal beam 4, which is suspended like a pendulum to central column 24, remains in mid plane P2 of front chassis P2. Transversal beam 4 rotates with central column 24 and remains orthogonal to mid plane P2 and to both side bars 33a and 33b of deformable parallelogram 30, while carriages 41a and 41b slide in free motion along said side bars, carried by transversal beam 4.

Consequently, the vehicle behaves on the road similarly to a two-wheel dynamically stabilized vehicle.

By contrast, when the vehicle stops, its speed decreases beyond a value allowing dynamical stabilization. Front chassis 2 tends to incline in relation to the ground, causing its mid plane P2 to swerve either side of mid plane P1 of rear chassis 1, which remains perpendicular to the ground.

The two side bars 33a and 33b of parallelogram 30, which are parallel to second mid plane P2, tend to incline in relation to transversal beam 4, which is subjected exclusively to gravitational force, thus remaining substantially horizontal. For example, if the body carried by front chassis 2 inclines towards the right side when looking forwards, the angle generated by side bar 33b of parallelogram 30 with the central part of transversal beam 4 tends to open above 90°, and side bar 33b than relies upon upper external bearing 44b and upon lower internal bearing 45b of carriage 3, 41b, strictly sliding against the sides of bar 33b, but prevented to roll by the means of the free wheels allowing the motion of the carriage exclusively towards the lower direction in relation to the corresponding side bar. Consequently, carriage 41b is locked in relation to side bar 33b, while said side bar is locked in relation to transversal beam 4. The parallelogram 30 becomes non-deformable while side bars 33a and 33b, parallel to second mid-plane P2, become integral in rotation with brackets 31a and 31b assembled with rear chassis 1, the said brackets remaining parallel to the ground. Thus the articulation 3 is locked and front chassis 2 remains slightly inclined in relation to the ground.

At standstill, this stability allows the vehicle to be equipped with a protection body for the driver, carried by front chassis 2.

However, as mentioned above, front chassis 2 remains slightly inclined in relation to the ground at standstill, so as to ensure the locking of articulation 3. Consequently, if vehicle starts in this position, it will slightly turn towards the side it is leant on before allowing the driver to find sufficient dynamical stability so as to raise the second mid plane P2 coincident with first mid plane P1 of rear chassis.

This disadvantage does not exist with a conventional two-wheeled vehicle, since the rider, by stepping foot on the ground, raises it in order to start straight forwards, but it is impossible to do so from inside an enclosed body.

The present invention solves this problem, by the means of an auxiliary platform 5 constituting a virtual ground, on which the driver applies so as to raise up the front chassis of the vehicle at starting, by unlocking the articulation.

In the example depicted on FIG. 1, this platform is constituted of two footboards 51 assembled horizontally on the lower ends of the two side bars 33a and 33b of parallelogram 30.

When the driver sits inside the vehicle at standstill, he may shut the body and set a foot on footboard 51 located to the side the body is leant on, so as to raise it by applying towards the opposite direction, for instance upon the steering handlebar 26. Thus, the mid plane P2 of front chassis 2 moves back to the vertical of center of gravity of horizontal beam 4, which becomes free, the articulation is then unlocked, allowing the vehicle to travel straight forwards. As soon as the speed becomes sufficient, the driver may provide dynamical stabilization in a similar way to two-wheeled vehicles. In order to avoid any interference on the deformable parallelogram, it is preferable, on the road, for the driver to let his/her feet rest on another set of footboards 25, mounted on tubular sheath 21 of front chassis 2, and rotating with said front chassis around longitudinal articulation axis x'x.

Figure 2:
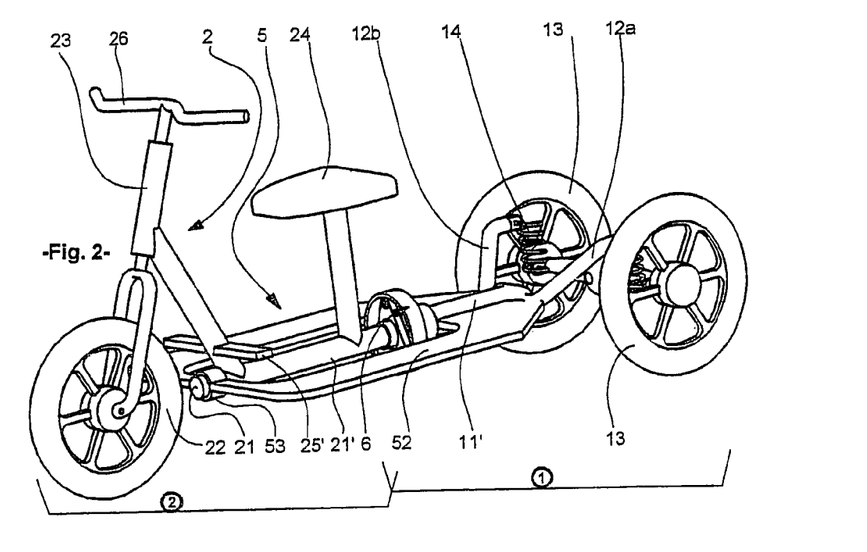
FIG. 2 shows in perspective view a second embodiment of articulated vehicle.

The articulation locking device may operate differently, as shown in embodiment depicted on FIG. 2.

As mentioned above, the vehicle is constituted with a rear chassis 1 and a front chassis 2, hinged with an articulation 3 fitted with a removable locking device.

By the means of a suspension spring 14, the rear chassis 1 rests on a rear axle 13 fitted with two spaced wheels, the spacing of which allowing sufficient stability at standstill, being however kept narrow enough so as to avoid an oversized caliber of the vehicle.

The whole unit of front chassis 2, bearing steering front wheel 22 and at least one seat 24 for the driver, is enclosed by an close body which has not been depicted on the figure, so as to preserve the legibility of drawing.

Figure 3:
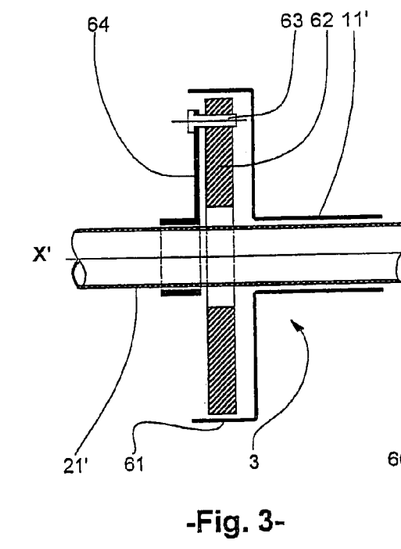
FIG. 3 is a diagrammatic longitudinal view of a pendulum type locking device such as used in embodiment shown in FIG. 2.

In this embodiment, the articulation 3, shown in a detailed description on FIG. 3, comprises a central axle 21', integral with front chassis 2, engaged in the tubular sheath 11' integral with rear chassis 1, and may be locked by the means of removable device 6.

Figure 4:
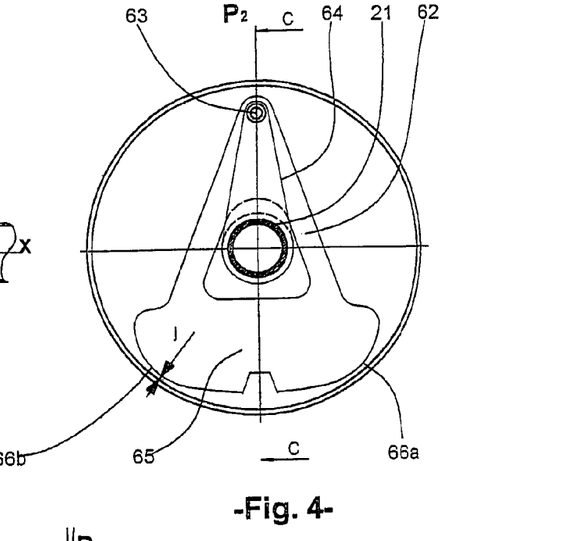
FIG. 4 is a front view of pendulum bolting device.

This locking device 6, shown in a detailed description on FIGS. 3 and 4, is mainly constituted with a casing 61 assembled with tubular sheath 11 of rear chassis 1, and bounded by a cylindrical collar providing the location of pendulum 62, suspended around longitudinal axle 63 and bracket 64, said bracket being integral in rotation with central axle 21 of front chassis 2, and perpendicular to said chassis.

Central axle 21' crosses pendulum 62 through an aperture with a large clearance, allowing an oscillating motion of said pendulum towards either side of median plane P2 of front chassis 2, wherein suspension axle 63 of said pendulum 62 is located. The lower of said pendulum is constituted of a weight or bob 65, fitted with two swellings 66a and 66b, slightly spaced from internal side of collar of casing 61 by narrow clearance j.

Consequently, when median plane P2 of front chassis 2 inclines in relation to the direction of apparent vertical specified by pendulum 62, the swelling 66 located on the inclined side applies against collar 61, since the shape of swellings 66 is designed so as to ensure the best contact possible between both parts.

Figure 5:
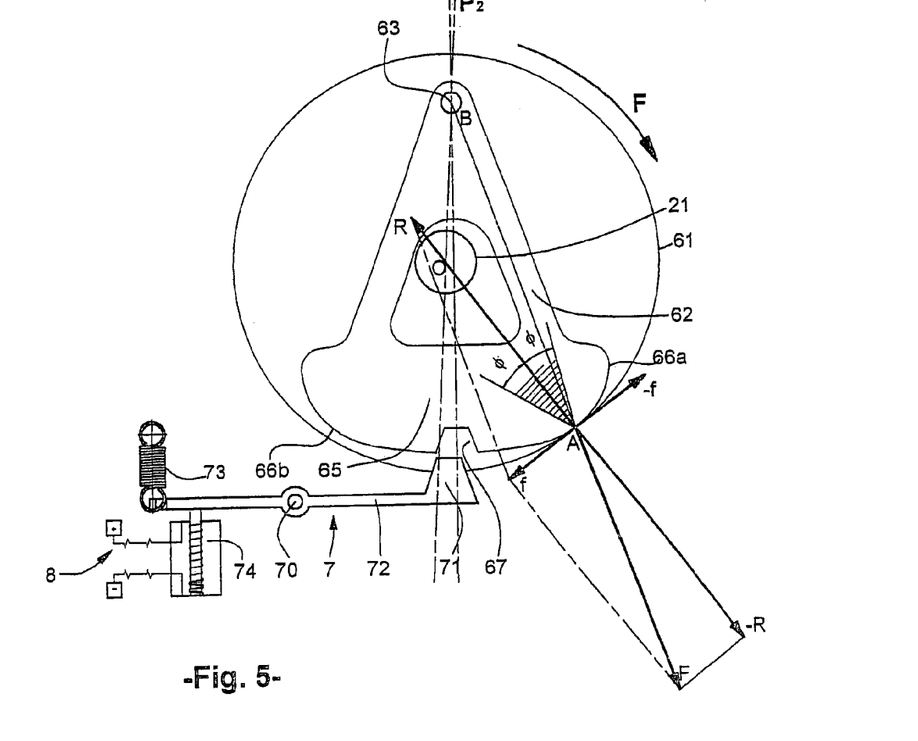
FIG. 5 schematically shows the functioning of the pendulum and a bolting device.

FIG. 5 shows the operating forces when the body of the vehicle, integral with front chassis 2, tends to incline for instance towards the right side, and suspension axle 63 of pendulum carried by bracket 64 integral in rotation with central axle 21' tends to rotate around axis x' x in the direction of arrow F.

The center of gravity of pendulum 62 moves then towards the right in relation to mid-plane P2, and corresponding swelling 66a of bob 65 applies against casing collar 61 in point A.

A force F now appears between point A and center B of articulation axle 63 of pendulum 62, compensated by the reaction R of casing, and running through center O of collar 61.

If admitted that f<φ.F, φ being the friction coefficient of swelling 66 upon internal surface of casing collar 61, the crutch created by pendulum 62 will buttress and consequently lock the rotation, since the two parts 11' and 21' become integral in rotation.

As mentioned above, the vehicle is fitted with an auxiliary platform 5 allowing the vehicle to be raised up at starting, by unlocking the articulation so as to travel straight forwards.

In the embodiment depicted in FIG. 2, auxiliary platform 5 is mounted on its rear end upon tubular sheath 11' and comprises two footboards 52, located on either side of central axle 21' of front chassis 2, and resting on said chassis, the said footboards resting at the front end on a bearing 53, around which axle 21' rotates in case of inclination of front chassis 2.

As mentioned above, the driver may, after having shut the body, apply on either footboard 52 of the side the front chassis 2 is leant on, so as to raise it up in order to unlock the link, the center of gravity of bob 65 thus moving back to mid-plane P2 of front chassis 2. When vehicle is traveling on the road, the driver may set both feet upon footboard 25', integral with front chassis 2.

However, as mentioned above, the locking of the inclination of the body is only necessary at a very low speed or at zero speed. If the driver is skilled enough to ensure dynamical stability by inclining the body according to the plane of apparent vertical detected by the direction of pendulum, it is preferable to avoid all risk of inopportune locking caused by an erroneous handling of driver, or by a major unevenness of the road.

This explains the presence, in the locking system, of a control command operating the bolting of pendulum above a certain speed value. Above this speed value, equivalent to the value wherefrom dynamical stabilization can be ensured, the articulation locking command is bolted, the body may incline since freed, and the driving of the vehicle becomes similar to usual two-wheeled vehicle driving.

Such a bolting device 7 is shown schematically in FIG. 5, which depicts a bolt 71 mounted on the end of a bracket 72, said bracket rotating around axle 70, assembled so as to slide into slot 67 located in median plane of bob 65.

A return spring 73 operates on bracket 72, maintaining bolt 71 in a spaced position allowing the functioning of pendulum and the locking of the link, if necessary.

However, an electromagnet 74 operated by control device 8, fitted with a speed-indicator, allows, above a certain speed-value, to slide bolt 71 into slot 67, and consequently to bolt pendulum 62 in its balanced position, so as to free the link. Below this speed value, electromagnet 74 does not operate, and bolt 71, being recalled by spring 73, frees pendulum 62.

Figures 6, 8:
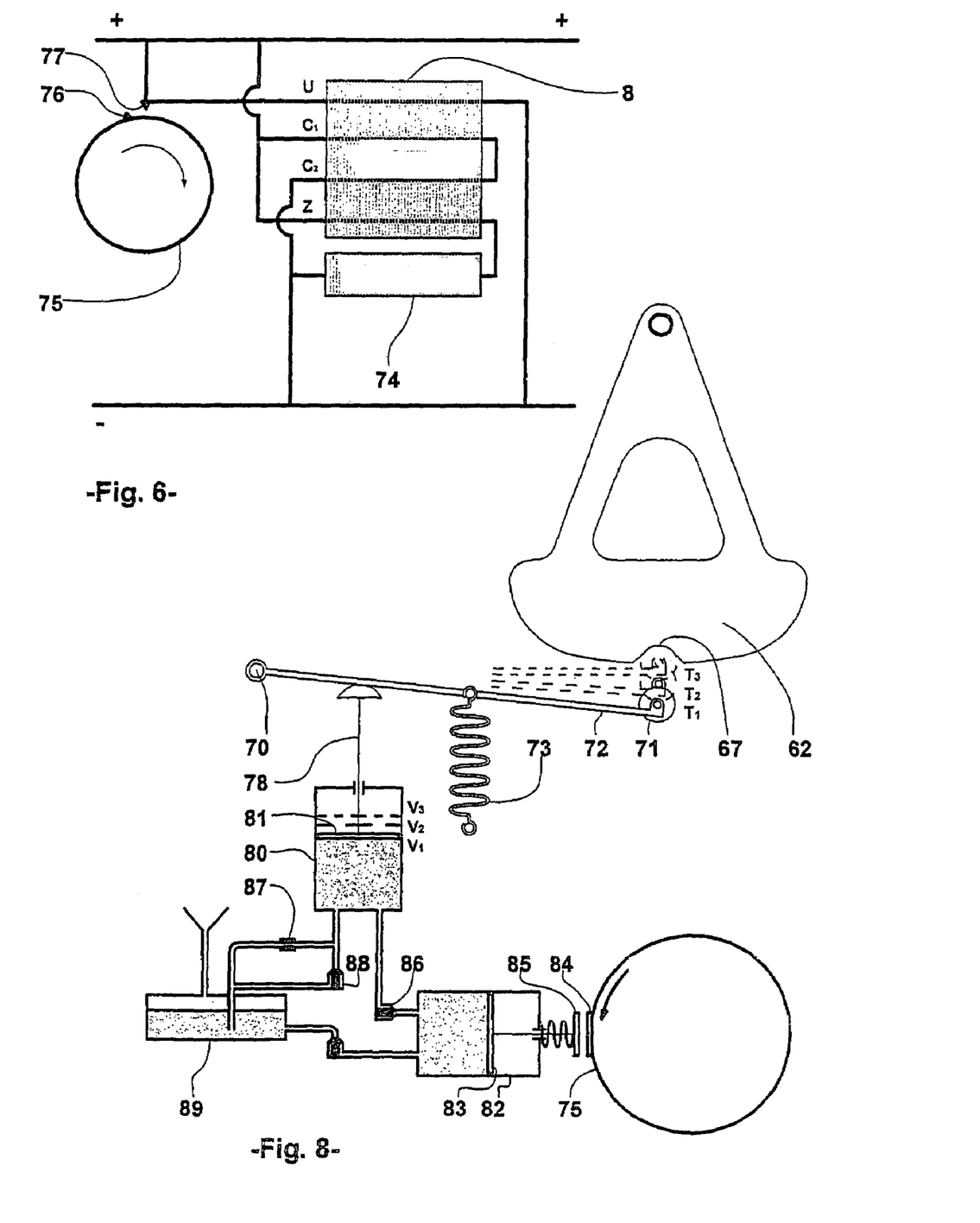
FIG. 6 is an electrical supply scheme for the bolting device.
FIG. 8 schematically shows a hydraulic bolting control system.

FIG. 6 shows, as an example, the scheme of an electric control device for bolt 71.

The speedometer comprises a wheel 75, linked for instance to either wheel of vehicle or pinion whose rotating speed is proportional with the speed of vehicle.

The wheel 75 is fitted with a metal outlined guide mark 76, whose round passing near a sensor 77 provides an impulse into incoming circuit U of temporized relay 8 comprising functions usually called B or C.

Generally speaking, this temporized relay 8 is fitted with incoming circuit U, receives the impulses from sensor 77, and comprises two connected circuits C1 and C2, constituting the operating circuit, and a supply circuit Z supplying electromagnet 74, or at least a relay for this electromagnet.

Figure 7A:
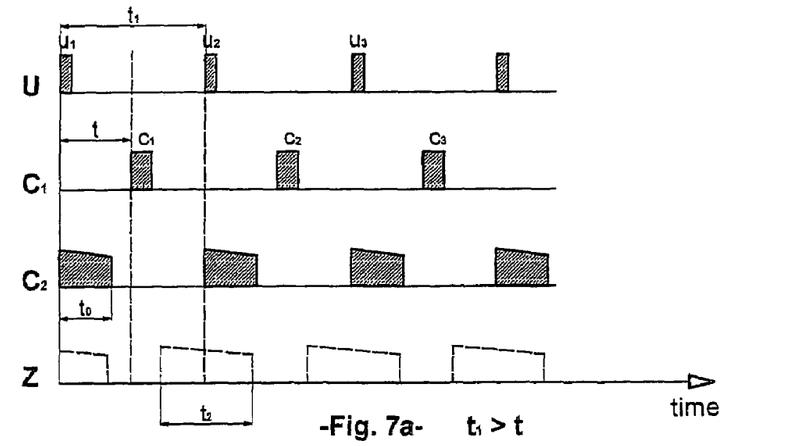
FIGS. 7a, 7b, 7c are diagrams depicting the functioning of the electrical bolting device.
Figure 7B:
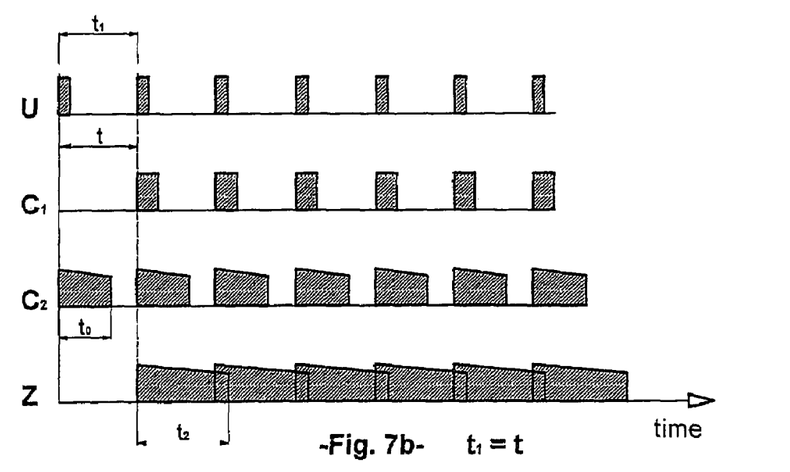
Figure 7C:
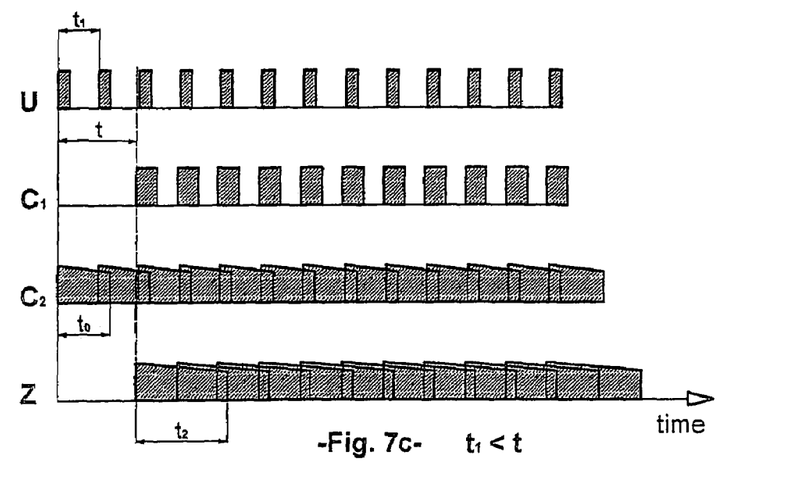

As depicted in FIGS. 7a, 7b, 7c, supply circuit Z is not supplied as long as time interval t1 between two impulses u1, u2 exceeds temporization t, and is supplied continuously as soon as t1 is below t. One impulse U1 causes a short closing of circuit C1, but only after delay t and immediate closing of circuit C2 during a t0 time, slightly inferior to t.

At starting, the speed is low, and t1 interval between two impulses is substantially greater than t. The impulse is ineffective, as the continuity C1+C2 is not ensured, (FIG. 7a), thus link 3 is locked. While speed increases, the impulses draw closer. As soon as time t1 between two successive impulses equals delay t (FIG. 7b), circuits C1 and C2 are closed simultaneously, causing the supplying of supply circuit Z during a time t2 superior to t, and consequently causing the continuous closing of this circuit, as long as t1 remains inferior to t (FIG. 7c).

Electromagnet 74 is then supplied, causing level 72 to swing around axle 70, integral, so as pendulum suspension axle 63, with plate 64, integral in rotation with front chassis 2. Bolt 71 then slides into slot 67, so pendulum 62 thus bolt in its median position is unable to cause any locking of front chassis 2 with rear chassis 1. The vehicle may then be driven in the same way as a two-wheeled engine.

Conversely, if the speed decreases, pendulum 62 is unbolted when t1 exceeds t, and consequently the link is locked, so as to ensure the stabilization of vehicle.

FIG. 8 schematically shows another example of a bolting and unbolting control system for pendulum 62.

As mentioned above, pendulum 62 may be locked in its median position, by the means of a bolt 71, constituted for instance with a roller sliding into slot 67 of pendulum 62. This bolt 71 is mounted on end of level 72, rotating around axle 70, and held in spaced position by the means of return spring 73.

Conversely, a pusher 78, operating against the action of return spring 73, allows level 72 to rotate so as to slide bolt 71 into slot 67.

This pusher 78 is mounted on piston 81 of jack 80 fitted with a pressure chamber, supplied by a lift and force pump 82, constituted by a cylindrical body, wherein a piston 83 is sliding, and operated by the means of wheel 75, whose rotating speed is in relation to the traveling speed of vehicle.

The back-and forth motion of piston 83 is therefore operated by a pair of permanent magnets mounted in opposition, that is to say with the similar poles facing each other, pole 84 located on wheel 75 and pole 85 located at the end of a rod connected to piston 83. A spring 86 brings piston 83 at rest.

Piston 83 receives an impulse each time magnet 84 draws near to magnet 85, and propels, towards jack 80 and through check valve 86, a certain amount of fluid so as to move plunger 81 of jack 80 from position V1 to a position V2, and consequently, to move bolt 71 from position T1 to a position T2. Similar successive actions tend to cause the sliding of bolt 71 into slot 47. However, the jack is fitted with a leakage control aperture 87, the damping action of which, together with recall of spring 73, makes the motion of bolt 71 dependent on the frequency of motion of pump 82, that is to say subordinate to the speed of vehicle. A valve 88 restrains the pressure in the circuits, and brings the fluid back into an out-of-pressure reservoir 89, when the speed increases.

This device operates as follows:

At standstill, spring 73 forces fluid back from jack 80 to reservoir 89 through leakage control aperture 87, and bolt 71 slides out of slot 67. Bob 65 is freed so the locking operates in case of inclination of vehicle;

At start, when first coincidence occurs between the positions of magnets 84 and 85, piston 83 is pushed and sends a certain amount of fluid to jack 80; the fluid removes piston 81 from position V1 to position V2, and removes bolt 71 from position T1 to position T2. Yet this position does not provide the bolting of the weight. The bolting occurs after one or several similar happenings, in relation to the frequency of the repetition of this happening, and in relation to the value of controlled leakage as well as to the specificity of the springs which determine from which impulse frequency on, that is actually from which traveling speed on, the leakage will be compensated by the supply of jack 80, so as to restrain bolt 71 inside slot 67. Pendulum 62 becomes then inhibited and chassis 2 may incline freely so as to ensure dynamical stability.

Of course, such a bolting system, electrically or hydraulically operated, may be fitted to a deformable parallelogram locking device such as depicted on FIG. 1, with bolt 71 sliding into a slot located in the center of transverse beam 4.

As a matter of fact, the invention is not limited to the details of the above mentioned embodiments, since other variations may as well be sought, within the scope of the claims. For instance, it is suitable to design a three-wheeled vehicle with a rear stabilization axle and a front directing wheel, although the said directing wheel might as well be replaced by two spaced wheels carried by the two bars of the deformable parallelogram, said parallelogram being located in the front of vehicle, as mentioned in above quoted French patent 2688465 of same Applicant.

The reference numerals inserted after the technical features in the claims are used to allow a better understanding of the claims and not to restrict the scope thereof.

The invention claimed is:

1. Articulated vehicle traveling on the ground into a longitudinal direction, comprising:

two chassis (1, 2) linked with each other by an articulation (3) rotating around longitudinal axis (x'x), parallel to the traveling direction, both said chassis having their mid planes intersecting in articulation axis, respectively i) a first chassis (1) resting on the ground by the means of a first rolling part (13) and centered on a first median plane (P1) perpendicular to the ground, and ii) a second chassis (2) resting on the ground by the means of a second rolling part (22), adjustable in relation to the traveling direction and centered on a second median plane (P2), able to be inclined in relation to the ground by rotation around articulation axis x'x, and a removable locking device (30, 6) of the articulation (3), comprising two parts (31, 61) (33, 64), integral in rotation, respectively of first and of second said chassis, and a removable locking device of articulation (3), comprising a pendulum type device (4) (62), controlling the integral rotation of said two parts, said pendulum type device (4) (62) being suspended to second chassis (2) and mounted oscillating in relation to the second median plane (P2), between a median position unlocking the articulation, wherein the second median plane (P2) is adjusted in relation to a vertical determined by a combination of gravitational and centrifugal forces, and a spaced position locking the articulation (3), at least, at standstill of vehicle, by inclination of second chassis (2) in relation to the vertical, wherein said second chassis comprises a device (5) so as to command the unlocking of the articulation, at least at start of vehicle, constituted of an auxiliary platform, integral in rotation with first chassis (1), fitted with two footboards (51) substantially located at same level above ground, on either side of articulation axis (x'x), each of said footboard constituting, on the side the vehicle is slanted, a support, for the driver of vehicle, so as to raise said second chassis (2), with return of pendulum (4) (62) to its articulation unlocking median position.

2. Articulated vehicle as claimed in claim 1, wherein the articulation between the two chassis comprises a central axle (11), integral in rotation with one of the chassis (1), and is fitted with a tubular sheath (21), integral in rotation with other chassis (2), said sheath (21) being assembled on central axle (11) and mounted rotating on said axle around longitudinal axis (x'x).

3. Articulated vehicle as claimed in claim 2, wherein locking device (30) comprises a set of articulated bars constituting a deformable parallelogram, fitted with two spaced bars (31, 32), substantially parallel to the ground, respectively a first bar (31) integral in rotation with first chassis and a second bar (32), articulated around longitudinal axle (34) located on second chassis (2), in said second median plane (P2) of said chassis, and fitted with two side bars (33), located on either sides of said second median plane (P2), and parallel to said second median plane (P2), and wherein control pendulum device comprises a stiff beam (4) suspended as a pendulum to second chassis (2), located transverse between said two side bars (33), in a substantially horizontal direction, and bound with means (41) so as to lock in rotation at least with one of said side bars (33) with said beam (4) by traveling laterally said beam (4) in relation to said second median plane (P2).

4. Articulated vehicle as claimed in claim 3, wherein said vehicle comprises two carriages (41) mounted so as to slide on pendulum beam (4), each assembled with clearance on one of the side bar (33) of parallelogram (30), said carriages (41) moving freely along said corresponding side bars (33) as long as pendulum beam (4) remains perpendicular to said second median plane (P2) of second chassis, said carriages being fitted by devices (44, 45) locking the relative traveling of corresponding side bar (33), determining the integral in rotation of said side bar (33) with pendulum beam (4) as well as the locking of articulation (3) when said second median plane (P2) of second chassis (2) tends to move away from the perpendicular direction to said beam (4).

5. Articulated vehicle as claimed in claim 3, wherein auxiliary platform (5) comprises two footboards (51) assembled respectively on the two side bars (33) of deformable parallelogram (30).

6. Articulated vehicle as claimed in claim 3, wherein transverse beam (4) is suspended as a pendulum to a part (24) integral in rotation with second chassis (2) by the means of two rods (42), articulated at their end around axis parallel to articulation axis (x'x) of the two chassis (1, 2), respectively, at an upper end to part (24) integral with second chassis (2), and at a lower end to transverse beam (4).

7. Articulated vehicle as claimed in claim 6, wherein the two suspension rods (42a, 42b) of beam (4) are mounted crosswise, each rod being articulated, respectively around a lower axis (43) on beam (4), and around an upper axis (43') on part (24) integral with second chassis (2), said two lower (43) and upper (43') axis of each rod (42) being located respectively on either side of said second median plane (P2) of second chassis (2).

8. Articulated vehicle as claimed in claim 3, wherein articulation comprises two parts, (11, 21), mounted rotating on each other around a longitudinal axis (x'x), said parts being integral in rotation, respectively, with first (1) and with second (2) chassis, wherein first transverse bar (31) of articulated set (30) is constituted with two brackets (31a, 31b), strictly assembled onto first part (11) of articulation and located on either side of longitudinal axis (x'x), and in that the second transverse bar is constituted by an equalizer (32) articulated on a central part (24) of second chassis (2) around a longitudinal axis (34) located in said second median plane (P2) of said second chassis.

9. Articulated vehicle as claimed in claim 8, wherein second transverse bar (32) is articulated on a central column (24), strictly assembled onto second part (21) of articulation (3), and bearing at least one seat for the driver of vehicle.

10. Articulated vehicle as claimed in claim 1, wherein locking device (6) of articulation (3) comprises a first part, integral in rotation with first chassis (1) constituted by a collar (61) surrounding articulation axis (x'x) of the two chassis (1, 2), and a second part integral in rotation with second chassis (2), constituted by a bracket (64), located in said second median plane (P2) and transverse to articulation axis (x'x), inside the collar (61), and bound to a commanding pendulum type device fitted with a crutch suspended to one end of said bracket (64), around an axle (63) parallel to articulation axis (x'x) and located in median plane of second chassis, said crutch oscillating inside collar (61), and resting on said collar at its lower end (66), in case of inclination of said second median plane (P2) in relation to the direction of crutch, causing buttressing of said crutch on collar (61) and locking of the inclination of second chassis (2).

11. Articulated vehicle as claimed in claim 1, wherein vehicle is fitted with a removable bolting device (7), while traveling on the road, of pendulum device (4, 62), in its median position which frees articulation, and with a command system (72, 74) operating bolting device (7) at a traveling speed above a given value.

12. Articulated vehicle as claimed in claim 11, wherein bolting device (7) comprises a bolt (71), said bolt being removable between a spaced position releasing pendulum device (4, 62) SO as to locate said pendulum device in its median position, a speed detection device (76, 84), and a control device (72, 74) removing the bolt (71) from a spaced position into a bolted position, operated by the speed detector (76, 84) when the speed of vehicle is above a given value.

13. Articulated vehicle as claimed in claim 12, wherein control device (72, 74) removing the bolt (71) from a spaced position into its locked position, is operated electrically by impulses sent by a speed detector, at a time interval Ti inversely proportional to the traveling speed of vehicle, by the means of a temporized relay (8) comprising an impulse reception circuit U, a supply circuit Z for the control device (74) during a T2 time from the impulse, a primary closing circuit C1 for the supply circuit Z with a given T delay time after each impulse, and a secondary closing circuit C2 for the supply circuit Z from the impulse during a given TO time inferior to said T delay time, so as to close continuously supply circuit Z when T1 time between two impulses u1, u2 is inferior to T delay time of primary closing circuit C1, and to open continuously said supply circuit Z, in the opposite circumstance.

14. Articulated vehicle as claimed in claim 12, wherein control device removing the bolt (71) is a lever (72) pushed towards the direction so as to lock bolt (71), against the action of a return spring (73) conjugated with a controlled leakage by the means of a pusher (78) mounted on a piston (81) of a first jack (80) supplied by a circuit (82) receiving impulses, each of one determining the transfer of a certain amount of hydraulic fluid into the chamber of jack (80), so as to push piston (81) and pusher (78) towards the direction so as to lock bolt (71), said impulses being generated by the means of a speed detector (75), at a frequency determined by the traveling speed of vehicle.

15. Articulated vehicle as claimed in claim 1, wherein said vehicle comprises two footboards (25) for the driver, assembled onto second chassis (2), on either sides of said second median plane (P2).

16. Articulated vehicle as claimed in claim 1, wherein locking device (30) comprises a set of articulated bars constituting a deformable parallelogram, fitted with two spaced bars (31, 32), substantially parallel to the ground, respectively a first bar (31) integral in rotation with first chassis and a second bar (32), articulated around longitudinal axle (34) located on second chassis (2), in said second median plane (P2) of said chassis, and fitted with two side bars (33), located on either sides of said second median plane (P2), and parallel to said mid second median plane, and wherein control pendulum device comprises a stiff beam (4) suspended as a pendulum to second chassis (2), located transverse between said two side bars (33), in a substantially horizontal direction, and bound with means (41) so as to lock in rotation at least with one of said side bars (33) with said beam (4) by traveling laterally said beam (4) in relation to said second median plane (P2).

17. Articulated vehicle as claimed in claim 4, wherein auxiliary platform (5) comprises two footboards (51) assembled respectively on the two side bars (33) of deformable parallelogram (30).

18. Articulated vehicle as claimed in claim 2, wherein locking device (6) of articulation (3) comprises a first part, integral in rotation with first chassis (1) constituted by a collar (61) surrounding articulation axis (x'x) of the two chassis (1, 2), and a second part integral in rotation with second chassis (2), constituted by a bracket (64), located in said second median plane (P2) and transverse to articulation axis (x'x), inside the collar (61), and bound to a commanding pendulum type device fitted with a crutch suspended to one end of said bracket (64), around an axle (63) parallel to articulation axis (x'x) and located in median plane of second chassis, said crutch oscillating inside collar (61), and resting on said collar at its lower end (66), in case of inclination of said second median plane (P2) in relation to the direction of crutch, causing buttressing of said crutch on collar (61) and locking of the inclination of second chassis (2).

* * * * *